US009797318B2

(12) United States Patent
Storch et al.

(10) Patent No.: US 9,797,318 B2
(45) Date of Patent: Oct. 24, 2017

(54) CALIBRATION SYSTEMS AND METHODS FOR MODEL PREDICTIVE CONTROLLERS

(71) Applicant: GM Global Technology Operations LLC, Detroit, MI (US)

(72) Inventors: Sharon L. Storch, Brighton, MI (US);
James A. Shore, Wixom, MI (US);
Kevin C. Wong, Ann Arbor, MI (US);
Ning Jin, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 889 days.

(21) Appl. No.: 14/032,508

(22) Filed: Sep. 20, 2013

(65) Prior Publication Data
US 2015/0039206 A1 Feb. 5, 2015

Related U.S. Application Data

(60) Provisional application No. 61/861,498, filed on Aug. 2, 2013.

(51) Int. Cl.
*G06F 7/00* (2006.01)
*F02D 28/00* (2006.01)
(Continued)

(52) U.S. Cl.
CPC .............. *F02D 28/00* (2013.01); *F02D 11/10* (2013.01); *F02D 13/0219* (2013.01);
(Continued)

(58) Field of Classification Search
CPC ...... F02D 28/00; F02D 11/10; F02D 41/1402; F02D 41/2464; F02D 13/0219; F02D 2041/1412; F02D 2041/1433; Y02T 10/18
See application file for complete search history.

(56) References Cited

U.S. PATENT DOCUMENTS

| 4,161,929 A | 7/1979 | Nohira et al. |
| 4,653,449 A | 3/1987 | Kamei et al. |

(Continued)

FOREIGN PATENT DOCUMENTS

| CN | 1594846 A | 3/2005 |
| CN | 103016177 | 4/2013 |

(Continued)

OTHER PUBLICATIONS

U.S. Appl. No. 14/675,828, filed Apr. 1, 2015, Long et al.
(Continued)

*Primary Examiner* — David Hamaoui

(57) ABSTRACT

A tangible computer readable medium of a vehicle includes object code referencing a plurality of variables, the object code for: identifying sets of possible target values based on air and exhaust setpoints for an engine; generating predicted parameters based on a model of the engine and the sets of possible target values, respectively; selecting one of the sets of possible target values based on the predicted parameters; setting target values based on the selected one of the sets of possible target values, respectively; and controlling opening of a throttle valve based on a first one of the target values. The tangible computer readable medium also includes calibration data stored separately and that includes predetermined values for the variables referenced in the object code, respectively. At least one processor executes the object code using the predetermined values to perform the identifying, the generating, the selecting, the setting, and the controlling.

16 Claims, 7 Drawing Sheets

(51) Int. Cl.
*F02D 13/02* (2006.01)
*F02D 41/14* (2006.01)
*F02D 11/10* (2006.01)
*F02D 41/24* (2006.01)

(52) U.S. Cl.
CPC ..... *F02D 41/1402* (2013.01); *F02D 41/2464* (2013.01); *F02D 2041/1412* (2013.01); *F02D 2041/1433* (2013.01); *Y02T 10/18* (2013.01)

(56) References Cited

U.S. PATENT DOCUMENTS

| | | | |
|---|---|---|---|
| 4,823,266 | A | 4/1989 | Baltusis et al. |
| 5,070,846 | A | 12/1991 | Dudek et al. |
| 5,101,786 | A | 4/1992 | Kamio et al. |
| 5,268,835 | A | 12/1993 | Miyagaki et al. |
| 5,270,935 | A | 12/1993 | Dudek et al. |
| 5,293,553 | A | 3/1994 | Dudek et al. |
| 5,347,446 | A | 9/1994 | Iino et al. |
| 5,357,932 | A * | 10/1994 | Clinton ............... F02D 13/0219 123/478 |
| 5,568,388 | A * | 10/1996 | Schnerer ............. B60T 8/172 701/1 |
| 5,609,136 | A | 3/1997 | Tuken |
| 5,706,780 | A | 1/1998 | Shirakawa |
| 5,727,528 | A | 3/1998 | Hori et al. |
| 5,740,033 | A | 4/1998 | Wassick et al. |
| 5,775,293 | A | 7/1998 | Kresse |
| 5,794,171 | A | 8/1998 | Bryant et al. |
| 5,921,219 | A | 7/1999 | Frohlich et al. |
| 6,014,955 | A | 1/2000 | Hosotani et al. |
| 6,155,230 | A | 12/2000 | Iwano et al. |
| 6,487,459 | B1 | 11/2002 | Martin et al. |
| 6,532,935 | B2 | 3/2003 | Ganser et al. |
| 6,550,052 | B1 * | 4/2003 | Joyce ................... G06F 8/20 700/113 |
| 6,571,191 | B1 * | 5/2003 | York ..................... F02D 41/2422 702/104 |
| 6,606,981 | B2 | 8/2003 | Itoyama |
| 6,619,261 | B1 | 9/2003 | Wang et al. |
| 6,704,638 | B2 | 3/2004 | Livshiz et al. |
| 6,714,852 | B1 | 3/2004 | Lorenz et al. |
| 6,826,904 | B2 | 12/2004 | Miura |
| 6,840,215 | B1 | 1/2005 | Livshiz et al. |
| 6,901,300 | B2 | 5/2005 | Blevins et al. |
| 6,925,372 | B2 | 8/2005 | Yasui |
| 6,928,362 | B2 * | 8/2005 | Meaney ............... F02D 41/2435 701/115 |
| 6,985,809 | B2 | 1/2006 | Yasui |
| 7,016,779 | B2 * | 3/2006 | Bowyer ............... F02D 41/0007 701/108 |
| 7,021,282 | B1 | 4/2006 | Livshiz et al. |
| 7,051,058 | B2 | 5/2006 | Wagner et al. |
| 7,076,953 | B2 | 7/2006 | Kreso |
| H002182 | H | 2/2007 | Freel et al. |
| 7,225,782 | B2 | 6/2007 | Pallett et al. |
| 7,274,986 | B1 | 9/2007 | Petridis et al. |
| 7,275,374 | B2 | 10/2007 | Stewart et al. |
| 7,328,577 | B2 | 2/2008 | Stewart et al. |
| 7,369,934 | B2 | 5/2008 | Chatfield et al. |
| 7,395,147 | B2 | 7/2008 | Livshiz et al. |
| 7,400,967 | B2 | 7/2008 | Ueno et al. |
| 7,418,372 | B2 | 8/2008 | Nishira et al. |
| 7,433,775 | B2 | 10/2008 | Livshiz et al. |
| 7,440,838 | B2 | 10/2008 | Livshiz et al. |
| 7,441,544 | B2 | 10/2008 | Hagari |
| 7,472,692 | B2 | 1/2009 | Nakagawa et al. |
| 7,614,384 | B2 | 11/2009 | Livshiz et al. |
| 7,650,219 | B2 | 1/2010 | Livshiz et al. |
| 7,650,225 | B2 | 1/2010 | Nakagawa et al. |
| 7,703,439 | B2 | 4/2010 | Russell et al. |
| 7,715,975 | B2 | 5/2010 | Yamaoka et al. |
| 7,775,195 | B2 | 8/2010 | Schondorf et al. |
| 7,783,409 | B2 | 8/2010 | Kang et al. |
| 7,813,869 | B2 | 10/2010 | Grichnik et al. |
| 7,885,756 | B2 | 2/2011 | Livshiz et al. |
| 7,941,260 | B2 | 5/2011 | Lee et al. |
| 7,967,720 | B2 | 6/2011 | Martin et al. |
| 8,032,235 | B2 | 10/2011 | Sayyar-Rodsari |
| 8,041,487 | B2 | 10/2011 | Worthing et al. |
| 8,050,841 | B2 | 11/2011 | Costin et al. |
| 8,073,610 | B2 | 12/2011 | Heap et al. |
| 8,103,425 | B2 | 1/2012 | Choi et al. |
| 8,103,428 | B2 | 1/2012 | Russ et al. |
| 8,116,954 | B2 | 2/2012 | Livshiz et al. |
| 8,176,735 | B2 | 5/2012 | Komatsu |
| 8,185,217 | B2 | 5/2012 | Thiele |
| 8,225,293 | B2 * | 7/2012 | Correa .................. G06F 8/665 714/35 |
| 8,241,177 | B2 | 8/2012 | Doering et al. |
| 8,255,139 | B2 | 8/2012 | Whitney et al. |
| 8,265,854 | B2 * | 9/2012 | Stewart ............... G05B 13/048 700/19 |
| 8,307,814 | B2 | 11/2012 | Leroy et al. |
| 8,316,827 | B2 | 11/2012 | Miyamoto et al. |
| 8,346,447 | B2 | 1/2013 | Baur et al. |
| 8,360,040 | B2 | 1/2013 | Stewart et al. |
| 8,447,492 | B2 | 5/2013 | Watanabe et al. |
| 8,468,821 | B2 | 6/2013 | Liu et al. |
| 8,483,935 | B2 | 7/2013 | Whitney et al. |
| RE44,452 | E | 8/2013 | Stewart et al. |
| 8,560,204 | B2 | 10/2013 | Simon, Jr. et al. |
| 8,572,961 | B2 | 11/2013 | Karnik et al. |
| 8,594,904 | B2 | 11/2013 | Livshiz et al. |
| 8,739,766 | B2 | 6/2014 | Jentz et al. |
| 8,760,003 | B2 | 6/2014 | Imura et al. |
| 8,862,248 | B2 | 10/2014 | Yasui |
| 8,954,257 | B2 | 2/2015 | Livshiz et al. |
| 9,052,997 | B2 | 6/2015 | Ono |
| 9,062,631 | B2 | 6/2015 | Kinugawa et al. |
| 9,075,406 | B2 | 7/2015 | Nakada |
| 9,127,614 | B2 | 9/2015 | Ueno et al. |
| 9,145,841 | B2 | 9/2015 | Miyazaki et al. |
| 9,175,628 | B2 | 11/2015 | Livshiz et al. |
| 9,222,443 | B2 | 12/2015 | Peters et al. |
| 9,243,524 | B2 | 1/2016 | Whitney et al. |
| 9,328,671 | B2 | 5/2016 | Whitney et al. |
| 9,334,815 | B2 | 5/2016 | Cygan, Jr. et al. |
| 9,399,959 | B2 | 7/2016 | Whitney et al. |
| 2001/0017126 | A1 | 8/2001 | Kowatari et al. |
| 2002/0038647 | A1 | 4/2002 | Tashiro et al. |
| 2002/0078924 | A1 | 6/2002 | Yagi |
| 2002/0124832 | A1 | 9/2002 | Oota et al. |
| 2002/0179050 | A1 | 12/2002 | Soliman et al. |
| 2003/0028265 | A1 | 2/2003 | Martin |
| 2003/0074892 | A1 | 4/2003 | Miura |
| 2003/0110760 | A1 | 6/2003 | Shirakawa |
| 2003/0145836 | A1 | 8/2003 | Linna et al. |
| 2003/0177765 | A1 | 9/2003 | Wang |
| 2003/0216856 | A1 | 11/2003 | Jacobson |
| 2004/0102890 | A1 | 5/2004 | Brunell |
| 2004/0107034 | A1 | 6/2004 | Togai et al. |
| 2004/0116220 | A1 | 6/2004 | Yamamoto et al. |
| 2004/0123600 | A1 | 7/2004 | Brunell et al. |
| 2005/0065691 | A1 | 3/2005 | Cho |
| 2005/0131620 | A1 | 6/2005 | Bowyer |
| 2005/0149209 | A1 | 7/2005 | Wojsznis et al. |
| 2005/0166900 | A1 | 8/2005 | Song et al. |
| 2005/0171670 | A1 | 8/2005 | Yoshioka et al. |
| 2005/0193739 | A1 | 9/2005 | Brunell et al. |
| 2005/0204726 | A1 | 9/2005 | Lewis |
| 2005/0228573 | A1 | 10/2005 | Gangopadhyay |
| 2005/0267608 | A1 | 12/2005 | Nishira et al. |
| 2006/0113799 | A1 | 6/2006 | Obayashi et al. |
| 2006/0137335 | A1 | 6/2006 | Stewart et al. |
| 2006/0137340 | A1 | 6/2006 | Stewart |
| 2006/0199699 | A1 | 9/2006 | Berglund et al. |
| 2006/0212140 | A1 | 9/2006 | Brackney |
| 2007/0068159 | A1 | 3/2007 | Ueno et al. |
| 2007/0174003 | A1 | 7/2007 | Ueno et al. |
| 2007/0276512 | A1 | 11/2007 | Fan et al. |
| 2008/0120009 | A1 | 5/2008 | Livshiz et al. |
| 2008/0127938 | A1 | 6/2008 | Hagari |
| 2008/0271718 | A1 | 11/2008 | Schondorf et al. |

(56) References Cited

U.S. PATENT DOCUMENTS

| | | |
|---|---|---|
| 2008/0276913 A1 | 11/2008 | Zubeck |
| 2008/0308066 A1 | 12/2008 | Martin et al. |
| 2009/0018733 A1 | 1/2009 | Livshiz et al. |
| 2009/0033264 A1 | 2/2009 | Falkenstein |
| 2009/0037066 A1 | 2/2009 | Kuwahara et al. |
| 2009/0037073 A1 | 2/2009 | Jung et al. |
| 2009/0118968 A1 | 5/2009 | Livshiz et al. |
| 2009/0118969 A1 | 5/2009 | Heap et al. |
| 2009/0118972 A1 | 5/2009 | Baur et al. |
| 2009/0143959 A1 | 6/2009 | Yamaoka et al. |
| 2009/0182484 A1 | 7/2009 | Loeffler et al. |
| 2009/0229562 A1 | 9/2009 | Ramappan et al. |
| 2009/0292435 A1 | 11/2009 | Costin et al. |
| 2010/0049419 A1 | 2/2010 | Yoshikawa et al. |
| 2010/0057283 A1 | 3/2010 | Worthing et al. |
| 2010/0057329 A1 | 3/2010 | Livshiz et al. |
| 2010/0075803 A1 | 3/2010 | Sharples et al. |
| 2010/0100248 A1 | 4/2010 | Minto et al. |
| 2010/0116249 A1 | 5/2010 | Guerrassi et al. |
| 2010/0116250 A1 | 5/2010 | Simon, Jr. et al. |
| 2010/0180876 A1 | 7/2010 | Leroy et al. |
| 2010/0211294 A1 | 8/2010 | Soejima |
| 2010/0222982 A1 | 9/2010 | Wang et al. |
| 2010/0263627 A1 | 10/2010 | Whitney et al. |
| 2010/0268436 A1 | 10/2010 | Soejima et al. |
| 2010/0280738 A1 | 11/2010 | Whitney et al. |
| 2011/0034298 A1 | 2/2011 | Doering et al. |
| 2011/0045948 A1 | 2/2011 | Doering et al. |
| 2011/0066308 A1 | 3/2011 | Yang et al. |
| 2011/0087421 A1 | 4/2011 | Soejima et al. |
| 2011/0100013 A1 | 5/2011 | Whitney et al. |
| 2011/0113773 A1 | 5/2011 | Liu et al. |
| 2011/0144838 A1 | 6/2011 | Matthews et al. |
| 2011/0225967 A1 | 9/2011 | Karnik et al. |
| 2011/0257789 A1 | 10/2011 | Stewart et al. |
| 2011/0264353 A1 | 10/2011 | Atkinson et al. |
| 2012/0065864 A1 | 3/2012 | Whitney et al. |
| 2012/0078468 A1 | 3/2012 | Popp et al. |
| 2012/0145123 A1 | 6/2012 | Ono |
| 2012/0150399 A1 | 6/2012 | Kar et al. |
| 2012/0203434 A1 | 8/2012 | Sujan et al. |
| 2012/0209493 A1 | 8/2012 | Miyata et al. |
| 2012/0221301 A1 | 8/2012 | Umeda et al. |
| 2012/0296557 A1 | 11/2012 | Ramappan et al. |
| 2013/0032123 A1 | 2/2013 | Kinugawa et al. |
| 2013/0032127 A1 | 2/2013 | Jentz et al. |
| 2013/0060448 A1 | 3/2013 | Nakada |
| 2013/0080023 A1 | 3/2013 | Livshiz et al. |
| 2013/0104859 A1 | 5/2013 | Miyazaki et al. |
| 2013/0151124 A1 | 6/2013 | Seiberlich et al. |
| 2013/0184961 A1 | 7/2013 | Kumar et al. |
| 2013/0213353 A1 | 8/2013 | Rollinger et al. |
| 2014/0076279 A1 | 3/2014 | Livshiz et al. |
| 2014/0174413 A1 | 6/2014 | Huang et al. |
| 2014/0174414 A1 | 6/2014 | Huang et al. |
| 2014/0238344 A1 | 8/2014 | Douglas |
| 2014/0311446 A1 | 10/2014 | Whitney et al. |
| 2014/0316681 A1 | 10/2014 | Whitney et al. |
| 2014/0316682 A1 | 10/2014 | Whitney et al. |
| 2014/0316683 A1 | 10/2014 | Whitney et al. |
| 2015/0039206 A1 | 2/2015 | Storch et al. |
| 2015/0105991 A1 | 4/2015 | Uhlirsch et al. |
| 2015/0253749 A1 | 9/2015 | Kniazev et al. |
| 2015/0275569 A1 | 10/2015 | LeBlanc |
| 2015/0275711 A1 | 10/2015 | Whitney et al. |
| 2015/0275771 A1 | 10/2015 | Pochner et al. |
| 2015/0275772 A1 | 10/2015 | Long et al. |
| 2015/0275783 A1 | 10/2015 | Wong et al. |
| 2015/0275784 A1 | 10/2015 | Whitney et al. |
| 2015/0275785 A1 | 10/2015 | Cygan, Jr. et al. |
| 2015/0275786 A1 | 10/2015 | Jin et al. |
| 2015/0275789 A1 | 10/2015 | Cygan, Jr. et al. |
| 2015/0275792 A1 | 10/2015 | Genslak et al. |
| 2015/0275794 A1 | 10/2015 | Verdejo et al. |
| 2015/0275795 A1 | 10/2015 | Cygan, Jr. et al. |
| 2015/0275796 A1 | 10/2015 | Pochner et al. |
| 2015/0275806 A1 | 10/2015 | Genslak et al. |
| 2015/0361915 A1 | 12/2015 | Sujan et al. |
| 2015/0369146 A1* | 12/2015 | Zavala Jurado .... F02D 41/0205 60/605.2 |
| 2016/0131061 A1 | 5/2016 | Whitney et al. |
| 2016/0237927 A1 | 8/2016 | Long et al. |
| 2016/0237932 A1 | 8/2016 | Long et al. |

FOREIGN PATENT DOCUMENTS

| | | |
|---|---|---|
| JP | 2005050000 A | 2/2005 |
| WO | WO-03-065135 A1 | 8/2003 |

OTHER PUBLICATIONS

U.S. Appl. No. 14/675,860, filed Apr. 2001, Long et al.

John C. G. Boot; "Quadratic Programming: Algorithms, Anomalies, Applications vol. 2 of Studies in mathematical and managerial economics"; North-Holland Publ.Comp., 1964; 213 pages.

N. Lawrence Ricker; "Use of quadratic programming for constrained internal model control"; Ind. Eng. Chem. Process Des. Dev., 1985, pp. 925-936.

C. E. Lemke; "A Method of Solution for Quadratic Programs"; Rensselaer Polytechnic Institute, Troy, New York, Published Online: Jul. 1, 1962, pp. 442-453.

U.S. Appl. No. 14/225,492, filed Mar. 26, 2014, Wong et al.
U.S. Appl. No. 14/225,496, filed Mar. 26, 2014, Pochner et al.
U.S. Appl. No. 14/225,502, filed Mar. 26, 2014, Long et al.
U.S. Appl. No. 14/225,507, filed Mar. 26, 2014, Jin et al.
U.S. Appl. No. 14/225,516, filed Mar. 26, 2014, Whitney et al.
U.S. Appl. No. 14/225,531, filed Mar. 26, 2014, Genslak et al.
U.S. Appl. No. 14/225,569, filed Mar. 26, 2014, Long et al.
U.S. Appl. No. 14/225,587, filed Mar. 26, 2014, Cygan Jr. et al.
U.S. Appl. No. 14/225,626, filed Mar. 26, 2014, Verdejo et al.
U.S. Appl. No. 14/225,808, filed Mar. 26, 2014, Whitney et al.
U.S. Appl. No. 14/225,817, filed Mar. 26, 2014, Cygan Jr. et al.
U.S. Appl. No. 14/225,891, filed Mar. 26, 2014, Genslak et al.
U.S. Appl. No. 14/225,896, filed Mar. 26, 2014, Cygan Jr. et al.
U.S. Appl. No. 14/226,006, filed Mar. 26, 2014, Pochner et al.
U.S. Appl. No. 14/226,121, filed Mar. 26, 2014, Wong et al.
U.S. Appl. No. 14/309,047, filed Jun. 19, 2014, Jose C. Zavala Jurado et al.
U.S. Appl. No. 13/613,588, filed Sep. 13, 2012, Livshiz et al.
U.S. Appl. No. 13/613,683, filed Sep. 13, 2012, Livshiz et al.
U.S. Appl. No. 13/686,069, filed Nov. 27, 2012, Livshiz et al.
U.S. Appl. No. 13/911,121, filed Jun. 6, 2013, Witney et al.
U.S. Appl. No. 13/911,132, filed Jun. 6, 2013, Witney et al.
U.S. Appl. No. 13/911,148, filed Jun. 6, 2013, Witney et al.
U.S. Appl. No. 13/911,156, filed Jun. 6, 2013, Witney et al.

Kolmanovsky, I., "Towards Engine and Powertrain Control Based on Model Predictive Control," (Sep. 28, 2012), Powerpoint Presentation, 47 slides.

U.S. Appl. No. 14/617,068, filed Feb. 9, 2015, Whitney et al.
U.S. Appl. No. 14/931,134, filed Nov. 3, 2015, Wong et al.
U.S. Appl. No. 15/181,559, filed Jun. 14, 2016, Shifang Li et al.

Y. Tian ; Department of Aerospace Engineering, the University of Michigan, Ann Arbor, United States; S. Li ; Y. -Y. Wang ; I. V. Kolmanovsky; "Risk prediction and its use for control of constrained systems with disturbances"; Published in 2015; American Control Conference (ACC); Chicago, IL USA; Jul. 1-3, 2015; pp. 2987-2992.

Garrod, David, Ph.D. Esq., "Glossary of Judicial Claim Constructions in the Electronics, Computer and Business Method Arts", Public Patent Foundation, Inc., 2010, pp. 256-257.

\* cited by examiner

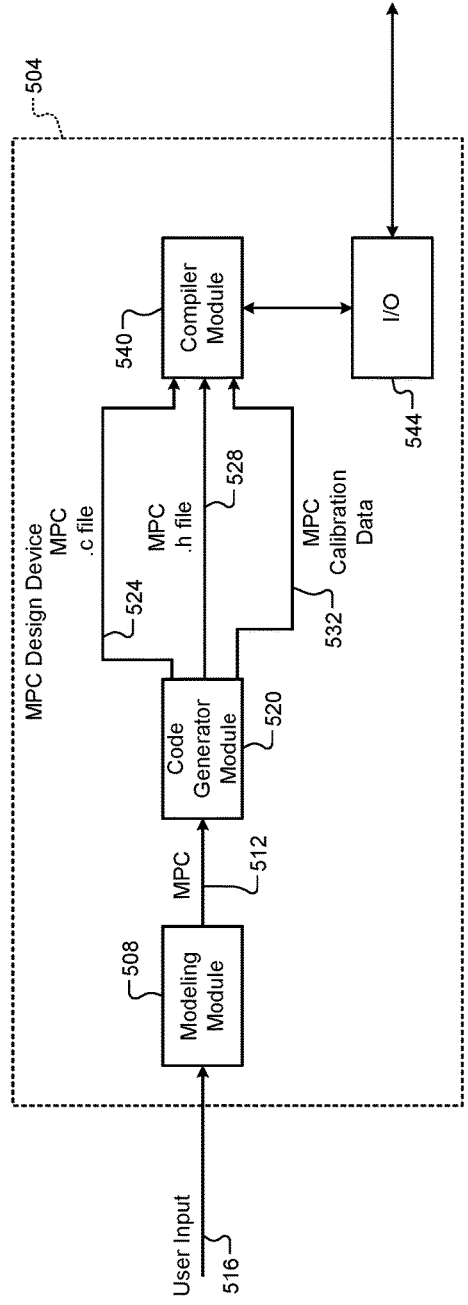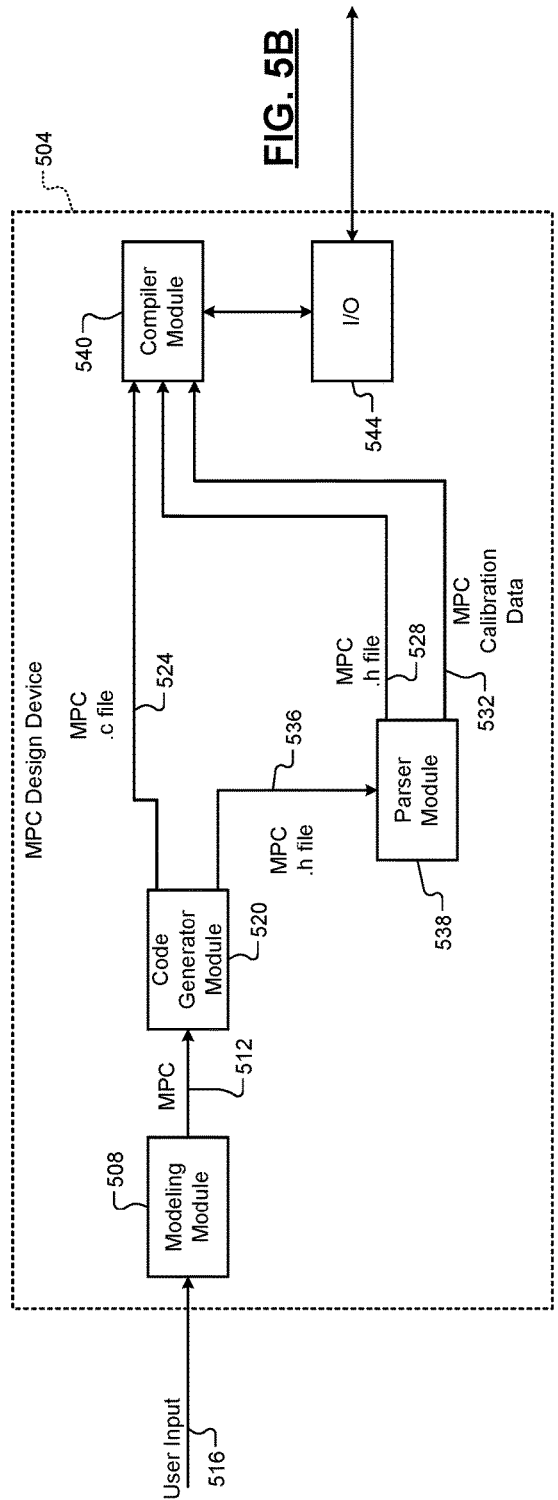

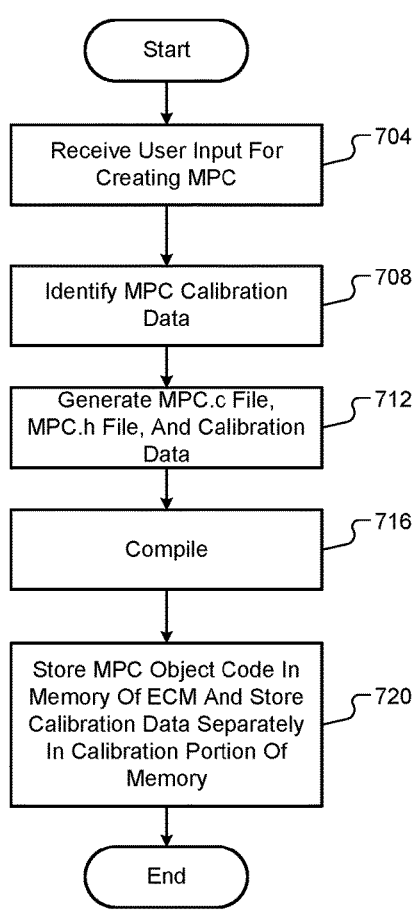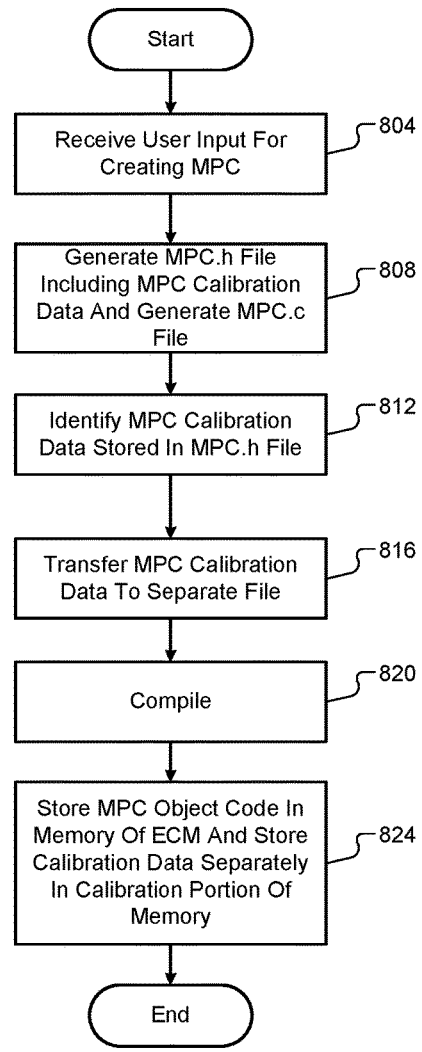
FIG. 7A
FIG. 7B

CALIBRATION SYSTEMS AND METHODS FOR MODEL PREDICTIVE CONTROLLERS

CROSS-REFERENCE TO RELATED APPLICATIONS

This application claims the benefit of U.S. Provisional Application No. 61/861,498, filed on Aug. 2, 2013. The disclosure of the above application is incorporated herein by reference in its entirety.

FIELD

The present disclosure relates to control systems and methods for vehicles and more particularly to systems and methods for calibrating model predictive controllers of vehicles.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

An engine control module (ECM) of a vehicle includes: a tangible computer readable medium and at least one processor. The tangible computer readable medium includes object code referencing a plurality of variables, the object code for: identifying sets of possible target values based on air and exhaust setpoints for an engine; generating predicted parameters based on a model of the engine and the sets of possible target values, respectively; selecting one of the sets of possible target values based on the predicted parameters; setting target values based on the selected one of the sets of possible target values, respectively; and controlling opening of a throttle valve based on a first one of the target values. The tangible computer readable medium also includes calibration data that is stored separate from the object code and that includes predetermined values for the variables referenced in the object code, respectively. The at least one processor executes the object code using the predetermined values to perform the identifying, the generating, the selecting, the setting, and the controlling.

In further features, the tangible computer readable medium further includes: data indicative of a first identifier of the object code; and data indicative of a second identifier of the calibration data.

In still further features, a calibration device is separate from the ECM, includes a display, and displays the predetermined values for the variables referenced in the object code on the display.

In yet further features, the calibration device further: includes a second set of calibration data including predetermined values for the variables referenced in the object code; and replaces the calibration data with the second set of calibration data in response to user input.

In further features, the tangible computer readable medium further includes: data indicative of a first identifier of the object code; and data indicative of a second identifier of the calibration data. The calibration device further replaces the data indicative of the second identifier with data indicative of a third identifier of the second set of calibration data after replacing the calibration data with the second set of calibration data.

In still further features a model predictive controller (MPC) design device generates a source code file, a header file, and the calibration data based on user input, compiles the source code file and the header file to produce the object code, stores the object code in the tangible computer readable medium of the ECM, and stores the calibration data in the tangible computer readable medium of the ECM separately from the object code.

In yet further features a model predictive controller (MPC) design device generates a source code file and a header file based on user input, the header file including the predetermined values for the variables referenced in the object code, identifies the predetermined values within the header file, generates the calibration data, transfers the predetermined values from the header file to the calibration data, compiles the source code file and the header file to produce the object code, stores the object code in the tangible computer readable medium of the ECM, and stores the calibration data in the tangible computer readable medium of the ECM separately from the object code.

In further features, the object code further includes object code for: controlling opening of a wastegate based on a second one of the target values; controlling opening of an exhaust gas recirculation (EGR) valve based on a third one of the target values; and controlling intake and exhaust valve phasing based on fourth and fifth ones of the target values, respectively.

In still further features, the object code further includes object code for selecting the one of the sets of possible target values further based on the air and exhaust setpoints.

In yet further features, the object code further includes object code for selecting the one of the sets of possible target values based on comparisons of the air and exhaust setpoints with the predicted parameters, respectively.

A method includes: using at least one processor of a vehicle, selectively executing object code using calibration data that is stored separately from the object code in a tangible computer readable medium of the vehicle, wherein the calibration data includes predetermined values for variables referenced in the object code, respectively. The object code includes object code for: identifying sets of possible target values based on air and exhaust setpoints for an engine; generating predicted parameters based on a model of the engine and the sets of possible target values, respectively; selecting one of the sets of possible target values based on the predicted parameters; setting target values based on the selected one of the sets of possible target values, respectively; and controlling opening of a throttle valve based on a first one of the target values.

In further features, the tangible computer readable medium further includes: data indicative of a first identifier of the object code; and data indicative of a second identifier of the calibration data.

In still further features, the method further includes, using a calibration device that is separate from the vehicle, displaying the predetermined values for the variables referenced in the object code on a display of the calibration device.

In yet further features, the method further includes, using the calibration device, replacing the calibration data with a second set of calibration data in response to user input, wherein the second set of calibration data includes predetermined values for the variables referenced in the object code.

In further features, the tangible computer readable medium further includes: data indicative of a first identifier of the object code; and data indicative of a second identifier of the calibration data. The method further includes: using the calibration device, further replacing the data indicative of the second identifier with data indicative of a third identifier of the second set of calibration data after replacing the calibration data with the second set of calibration data.

In still further features, the method further includes, using a model predictive controller (MPC) design device that is separate from the vehicle: generating a source code file, a header file, and the calibration data based on user input; compiling the source code file and the header file to produce the object code; storing the object code in the tangible computer readable medium; and storing the calibration data in the tangible computer readable medium, separately from the object code.

In yet further features, the method further includes, using a model predictive controller (MPC) design device that is separate from the vehicle: generating a source code file and a header file based on user input, the header file including the predetermined values for the variables referenced in the object code; identifying the predetermined values within the header file; generating the calibration data; transferring the predetermined values from the header file to the calibration data; compiling the source code file and the header file to produce the object code; storing the object code in the tangible computer readable medium; and storing the calibration data in the tangible computer readable medium, separately from the object code.

In further features, the object code further includes object code for: controlling opening of a wastegate based on a second one of the target values; controlling opening of an exhaust gas recirculation (EGR) valve based on a third one of the target values; and controlling intake and exhaust valve phasing based on fourth and fifth ones of the target values, respectively.

In still further features, the object code further includes object code for selecting the one of the sets of possible target values further based on the air and exhaust setpoints.

In yet further features, the object code further includes object code for selecting the one of the sets of possible target values based on comparisons of the air and exhaust setpoints with the predicted parameters, respectively.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 5A and 5B are functional block diagrams of example model predictive control design devices according to the present disclosure;

FIGS. 7A and 7B are flowcharts depicting example methods of generating and storing a file including code for the model predictive control module and a file including calibration data for the model predictive control module according to the present disclosure.

In the drawings, reference numbers may be reused to identify similar and/or identical elements.

DETAILED DESCRIPTION

Figure 1:
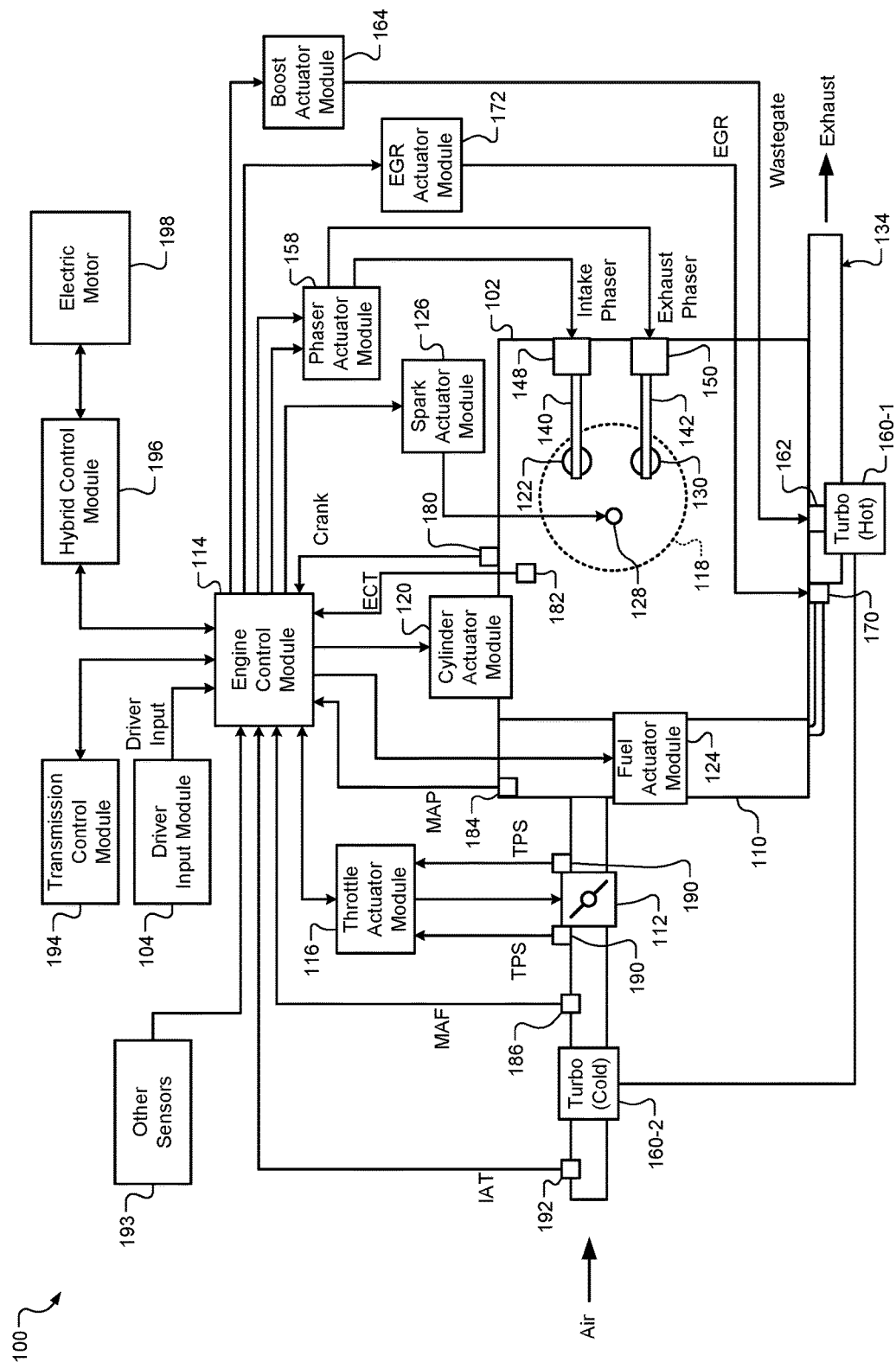
FIG. 1 is a functional block diagram of an example engine system according to the present disclosure.

An engine control module (ECM) controls torque output of an engine. More specifically, the ECM controls actuators of the engine based on target values, respectively, to produce a requested amount of torque. For example, the ECM controls intake and exhaust camshaft phasing based on target intake and exhaust phaser angles, a throttle valve based on a target throttle opening, an exhaust gas recirculation (EGR) valve based on a target EGR opening, and a wastegate of a turbocharger based on a target wastegate duty cycle.

The ECM could determine the target values individually using multiple single input single output (SISO) controllers, such as proportional integral derivative (PID) controllers. However, when multiple SISO controllers are used, the target values may be set to maintain system stability at the expense of possible fuel consumption decreases. Additionally, calibration and design of the individual SISO controllers may be costly and time consuming.

The ECM of the present disclosure includes a model predictive controller (MPC) that generates the target values. More specifically, the MPC identifies possible sets of target values for achieving various engine air and exhaust setpoints, such as an intake manifold pressure setpoint, an air per cylinder (APC) setpoint, external and residual dilution setpoints, and a compression ratio setpoint. Constraints for the setpoints and constraints for the target values are also accounted for. The MPC determines predicted parameters (responses) for each of the possible sets based on the possible sets' target values and a model of the engine.

The MPC determines a cost associated with use of each of the possible sets based on comparisons of the predicted parameters with the setpoints, respectively. For example, the MPC may determine the cost associated with a possible set based on how quickly the predicted parameters reach the setpoints and/or how far the predicted parameters overshoot the setpoints, respectively. The MPC may select the one of the possible sets having the lowest cost, and set the target values using the target values of the selected possible set.

A user can design the MPC including creating code providing the functionality of the MPC and set values of variables referenced in the code using a computing device executing an MPC design application. Design applications generate a code file that includes source code (e.g., a .c file) providing the functionality of the MPC and a header file that includes data that supports the source code, such as values for variables referenced in the source code, variable declarations, and other data. Design applications compile the code and header files to produce object code that is executable by the ECM. The object code is then stored in the ECM.

To change one or more values for the variables referenced in the code, the user may change the one or more values using the design application, re-compile the code and header files (since one or more of the values stored in the header file are now different), and re-store the re-compiled object code within the ECM. This process, however, is time and resource consuming.

In the ECM of the present disclosure, the values for the variables referenced in the code are stored in a file separately from the code file and the header file. For example, the design application may generate a separate file that includes the values or a parser may identify the values stored in the header file and store the values from the header file in the separate file. The values for the variables are then stored in the ECM separately from the object code.

The values for the variables referenced by the object code being stored separately from the object code enables changes to be made to one or more of the values without having to re-compile the code and header files, and re-store the re-compiled object code within the ECM. For example, an external device can store multiple different sets of the values and can load different sets of values to the ECM during vehicle design to tune the MPC without having to change the object code. Also, the values can be easily updated, such as during vehicle service, if a different set of the values is later chosen for use.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The engine 102 may be a gasoline spark ignition internal combustion engine.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a turbocharger that includes a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172 based on signals from the ECM 114.

A position of the crankshaft may be measured using a crankshaft position sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The engine system 100 may also include one or more other sensors 193, such as an ambient humidity sensor, one or more knock sensors, a compressor outlet pressure sensor and/or a throttle inlet pressure sensor, a wastegate position sensor, an EGR position sensor, and/or one or more other suitable sensors. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phases angles, respectively. The EGR actuator module 172 may control the EGR valve 170 to achieve a target EGR opening area. The boost actuator module 164 controls the wastegate 162 to achieve a target wastegate opening area. The cylinder actuator module 120 controls cylinder deactivation to achieve a target number of activated or deactivated cylinders.

The ECM 114 generates the target values for the engine actuators to cause the engine 102 to generate a target engine output torque. The ECM 114 generates the target values for the engine actuators using model predictive control, as discussed further below.

Figure 2:
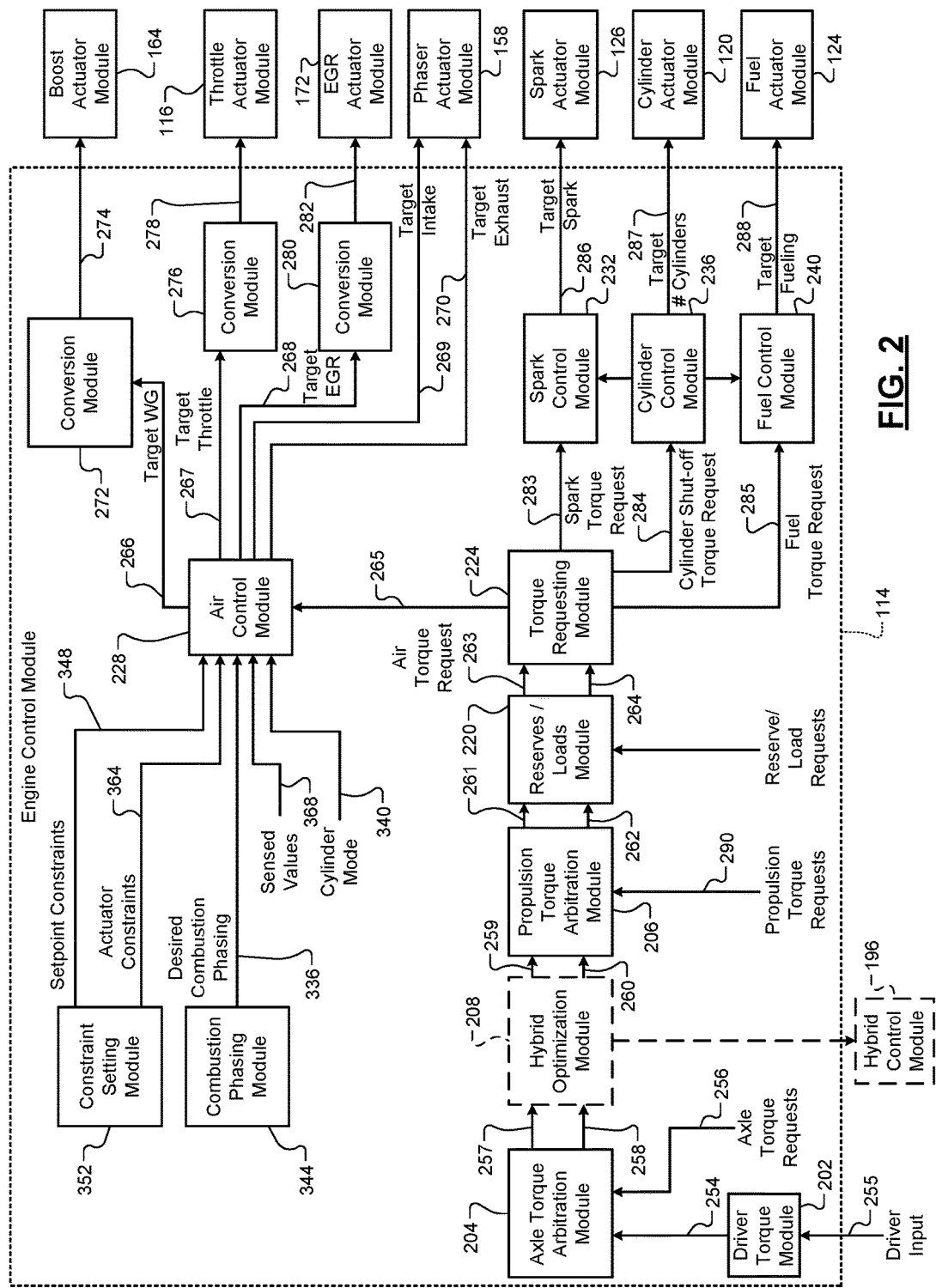
FIG. 2 is a functional block diagram of an example engine control system according to the present disclosure.

Referring now to FIG. 2, a functional block diagram of an example engine control system is presented. An example implementation of the ECM 114 includes a driver torque module 202, an axle torque arbitration module 204, and a propulsion torque arbitration module 206. The ECM 114 may include a hybrid optimization module 208. The ECM 114 also includes a reserves/loads module 220, a torque requesting module 224, an air control module 228, a spark control module 232, a cylinder control module 236, and a fuel control module 240.

The driver torque module 202 may determine a driver torque request 254 based on a driver input 255 from the driver input module 104. The driver input 255 may be based on, for example, a position of an accelerator pedal and a position of a brake pedal. The driver input 255 may also be based on cruise control, which may be an adaptive cruise control system that varies vehicle speed to maintain a predetermined following distance. The driver torque module 202 may store one or more mappings of accelerator pedal position to target torque and may determine the driver torque request 254 based on a selected one of the mappings.

An axle torque arbitration module 204 arbitrates between the driver torque request 254 and other axle torque requests 256. Axle torque (torque at the wheels) may be produced by various sources including an engine and/or an electric motor. For example, the axle torque requests 256 may include a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips in the other direction with respect to the road surface because the axle torque is negative.

The axle torque requests 256 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 256 may also be generated by vehicle stability control systems.

The axle torque arbitration module 204 outputs a predicted torque request 257 and an immediate torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control the engine actuators.

In general terms, the immediate torque request 258 may be an amount of currently desired axle torque, while the predicted torque request 257 may be an amount of axle torque that may be needed on short notice. The ECM 114 controls the engine system 100 to produce an axle torque equal to the immediate torque request 258. However, different combinations of target values may result in the same axle torque. The ECM 114 may therefore adjust the target values to enable a faster transition to the predicted torque request 257, while still maintaining the axle torque at the immediate torque request 258.

In various implementations, the predicted torque request 257 may be set based on the driver torque request 254. The immediate torque request 258 may be set to less than the predicted torque request 257 under some circumstances, such as when the driver torque request 254 is causing wheel slip on an icy surface. In such a case, a traction control system (not shown) may request a reduction via the immediate torque request 258, and the ECM 114 reduces the engine torque output to the immediate torque request 258. However, the ECM 114 performs the reduction so the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque with minimal delay. Fast engine actuators are defined in contrast with slow engine actuators.

In general terms, fast engine actuators can change the axle torque more quickly than slow engine actuators. Slow actuators may respond more slowly to changes in their respective target values than fast actuators do. For example, a slow actuator may include mechanical components that require time to move from one position to another in response to a change in target value. A slow actuator may also be characterized by the amount of time it takes for the axle torque to begin to change once the slow actuator begins to implement the changed target value. Generally, this amount of time will be longer for slow actuators than for fast actuators. In addition, even after beginning to change, the axle torque may take longer to fully respond to a change in a slow actuator.

For example only, the spark actuator module 126 may be a fast actuator. Spark-ignition engines may combust fuels including, for example, gasoline and ethanol, by applying a spark. By way of contrast, the throttle actuator module 116 may be a slow actuator.

For example, as described above, the spark actuator module 126 can vary the spark timing for a next firing event when the spark timing is changed between a last firing event and the next firing event. By way of contrast, changes in throttle opening take longer to affect engine output torque. The throttle actuator module 116 changes the throttle opening by adjusting the angle of the blade of the throttle valve 112. Therefore, when the target value for opening of the throttle valve 112 is changed, there is a mechanical delay as the throttle valve 112 moves from its previous position to a new position in response to the change. In addition, air flow changes based on the throttle opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening to a value that would allow the engine 102 to produce the predicted torque request 257. Meanwhile, the spark timing can be set based on the immediate torque request 258, which is less than the predicted torque request 257. Although the throttle opening generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark timing to an optimum value, which allows the engine 102 to produce the full engine output torque achievable with the air flow already present. The engine output torque may therefore be quickly increased to the predicted torque request 257 without experiencing delays from changing the throttle opening.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 290, including the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests may be generated by modifying one of the received requests based on another one or more of the received torque requests.

For example, the propulsion torque requests 290 may include torque reductions for engine over-speed protection, torque increases for stall prevention, and torque reductions requested by the transmission control module 194 to accommodate gear shifts. The propulsion torque requests 290 may also result from clutch fuel cutoff, which reduces the engine output torque when the driver depresses the clutch pedal in a manual transmission vehicle to prevent a flare (rapid rise) in engine speed.

The propulsion torque requests 290 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the torque requesting module 224.

For example only, a catalyst light-off process or a cold start emissions reduction process may require retarded spark timing. The reserves/loads module 220 may therefore increase the adjusted predicted torque request 263 above the adjusted immediate torque request 264 to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request 263 while leaving the adjusted immediate torque request 264 unchanged to produce the torque reserve. Then, when the A/C compressor clutch engages, the reserves/loads module 220 may increase the adjusted immediate torque request 264 by the estimated load of the A/C compressor clutch.

The torque requesting module 224 receives the adjusted predicted and immediate torque requests 263 and 264. The torque requesting module 224 determines how the adjusted predicted and immediate torque requests 263 and 264 will be achieved. The torque requesting module 224 may be engine type specific. For example, the torque requesting module 224 may be implemented differently or use different control schemes for spark-ignition engines versus compression-ignition engines.

In various implementations, the torque-requesting module 224 may define a boundary between modules that are common across all engine types and modules that are engine type specific. For example, engine types may include spark-ignition and compression-ignition. Modules prior to the torque requesting module 224, such as the propulsion torque arbitration module 206, may be common across engine types, while the torque requesting module 224 and subsequent modules may be engine type specific.

The torque requesting module 224 determines an air torque request 265 based on the adjusted predicted and immediate torque requests 263 and 264. The air torque request 265 may be a brake torque. Brake torque may refer to torque at the crankshaft under the current operating conditions.

Target values for airflow controlling engine actuators are determined based on the air torque request 265. More specifically, based on the air torque request 265, the air control module 228 determines a target wastegate opening area 266, a target throttle opening area 267, a target EGR opening area 268, a target intake cam phaser angle 269, and a target exhaust cam phaser angle 270. The air control module 228 determines the target wastegate opening area 266, the target throttle opening area 267, the target EGR opening area 268, the target intake cam phaser angle 269, and the target exhaust cam phaser angle 270 using model predictive control, as discussed further below.

The boost actuator module 164 controls the wastegate 162 to achieve the target wastegate opening area 266. For example, a first conversion module 272 may convert the target wastegate opening area 266 into a target duty cycle 274 to be applied to the wastegate 162, and the boost actuator module 164 may apply a signal to the wastegate 162 based on the target duty cycle 274. In various implementations, the first conversion module 272 may convert the target wastegate opening area 266 into a target wastegate position (not shown), and convert the target wastegate position into the target duty cycle 274.

The throttle actuator module 116 controls the throttle valve 112 to achieve the target throttle opening area 267. For example, a second conversion module 276 may convert the target throttle opening area 267 into a target duty cycle 278 to be applied to the throttle valve 112, and the throttle actuator module 116 may apply a signal to the throttle valve 112 based on the target duty cycle 278. In various implementations, the second conversion module 276 may convert the target throttle opening area 267 into a target throttle position (not shown), and convert the target throttle position into the target duty cycle 278.

The EGR actuator module 172 controls the EGR valve 170 to achieve the target EGR opening area 268. For example, a third conversion module 280 may convert the target EGR opening area 268 into a target duty cycle 282 to be applied to the EGR valve 170, and the EGR actuator module 172 may apply a signal to the EGR valve 170 based on the target duty cycle 282. In various implementations, the third conversion module 280 may convert the target EGR opening area 268 into a target EGR position (not shown), and convert the target EGR position into the target duty cycle 282.

The phaser actuator module 158 controls the intake cam phaser 148 to achieve the target intake cam phaser angle 269. The phaser actuator module 158 also controls the exhaust cam phaser 150 to achieve the target exhaust cam phaser angle 270. In various implementations, a fourth conversion module (not shown) may be included and may convert the target intake and exhaust cam phaser angles into target target intake and exhaust duty cycles, respectively. The phaser actuator module 158 may apply the target intake and exhaust duty cycles to the intake and exhaust cam phasers 148 and 150, respectively.

The torque requesting module 224 may also generate a spark torque request 283, a cylinder shut-off torque request 284, and a fuel torque request 285 based on the predicted and immediate torque requests 263 and 264. The spark control module 232 may determine how much to retard the spark timing (which reduces engine output torque) from an optimum spark timing based on the spark torque request 283. For example only, a torque relationship may be inverted to solve for a target spark timing 286. For a given torque request ($T_{Req}$), the target spark timing ($S_T$) 286 may be determined based on:

$$S_T = f^{-1}(T_{Req}, APC, I, E, AF, OT, \#). \quad (1)$$

This relationship may be embodied as an equation and/or as a lookup table. The air/fuel ratio (AF) may be the actual air/fuel ratio, as reported by the fuel control module 240.

When the spark timing is set to the optimum spark timing, the resulting torque may be as close to a maximum best torque (MBT) as possible. MBT refers to the maximum engine output torque that is generated for a given air flow as spark timing is advanced, while using fuel having an octane rating greater than a predetermined octane rating and using stoichiometric fueling. The spark timing at which this maximum torque occurs is referred to as an MBT spark timing. The optimum spark timing may differ slightly from MBT spark timing because of, for example, fuel quality (such as when lower octane fuel is used) and environmental factors, such as ambient humidity and temperature. The engine output torque at the optimum spark timing may therefore be less than MBT. For example only, a table of optimum spark timings corresponding to different engine operating conditions may be determined during a calibration phase of vehicle design, and the optimum value is determined from the table based on current engine operating conditions.

The cylinder shut-off torque request 284 may be used by the cylinder control module 236 to determine a target number of cylinders to deactivate 287. In various implementations, a target number of cylinders to activate may be used. The cylinder actuator module 120 selectively activates and deactivates the valves of cylinders based on the target number 287.

The cylinder control module 236 may also instruct the fuel control module 240 to stop providing fuel for deactivated cylinders and may instruct the spark control module 232 to stop providing spark for deactivated cylinders. The spark control module 232 may stop providing spark to a cylinder once an fuel/air mixture that is already present in the cylinder has been combusted.

The fuel control module 240 may vary the amount of fuel provided to each cylinder based on the fuel torque request 285. More specifically, the fuel control module 240 may generate target fueling parameters 288 based on the fuel torque request 285. The target fueling parameters 288 may include, for example, target mass of fuel, target injection starting timing, and target number of fuel injections.

During normal operation, the fuel control module 240 may operate in an air lead mode in which the fuel control module 240 attempts to maintain a stoichiometric air/fuel ratio by controlling fueling based on air flow. For example, the fuel control module 240 may determine a target fuel mass that will yield stoichiometric combustion when combined with a present mass of air per cylinder (APC).

Figure 3:
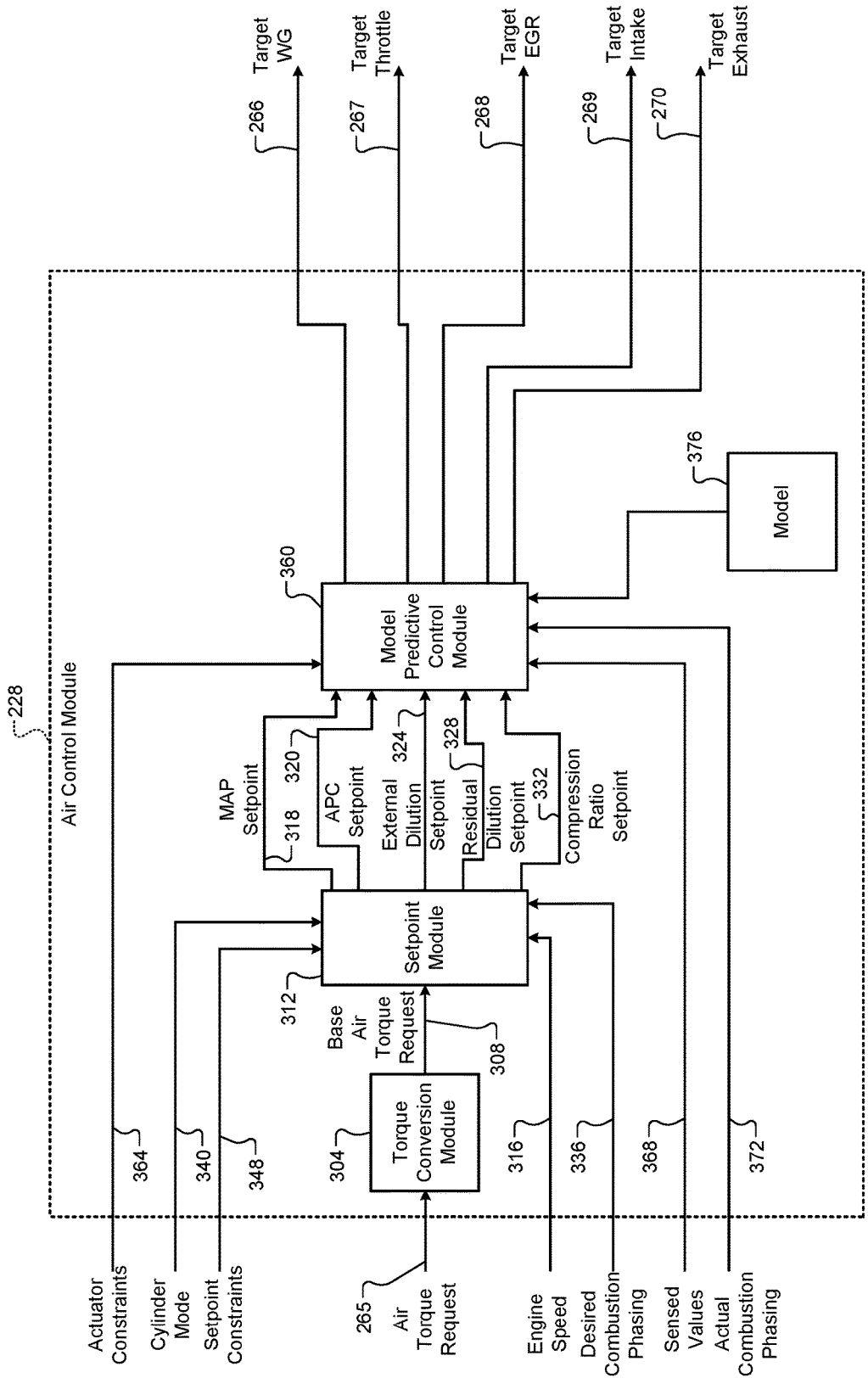
FIG. 3 is a functional block diagram of an example air control module according to the present disclosure.

FIG. 3 is a functional block diagram of an example implementation of the air control module 228. Referring now to FIGS. 2 and 3, as discussed above, the air torque request 265 may be a brake torque. A torque conversion module 304 converts the air torque request 265 from brake torque into base torque. The torque request resulting from conversion into base torque will be referred to as a base air torque request 308.

Base torques may refer to torque at the crankshaft made during operation of the engine 102 on a dynamometer while the engine 102 is warm and no torque loads are imposed on the engine 102 by accessories, such as an alternator and the A/C compressor. The torque conversion module 304 may convert the air torque request 265 into the base air torque request 308, for example, using a mapping or a function that relates brake torques to base torques.

In various implementations, the torque conversion module 304 may convert the air torque request 265 into another type of torque that is suitable for use by a setpoint module 312, such as an indicated torque. An indicated torque may refer to a torque at the crankshaft attributable to work produced via combustion within the cylinders.

The setpoint module 312 generates setpoint values for controlling the throttle valve 112, the EGR valve 170, the wastegate 162, the intake cam phaser 148, and the exhaust cam phaser 150 to achieve the base air torque request 308 at a present engine speed 316. The setpoints may be referred to as engine air and exhaust setpoints. The engine speed 316 may be determined, for example, based on a crankshaft position measured using the crankshaft position sensor 180.

For example, the setpoint module 312 may generate a manifold pressure (e.g., a MAP) setpoint 318, a mass of air per cylinder (APC) setpoint 320, an external dilution setpoint 324, a residual dilution setpoint 328, and an effective compression ratio setpoint 332. The setpoint module 312 may generate the manifold pressure setpoint 318, the APC setpoint 320, the external dilution setpoint 324, the residual dilution setpoint 328, and the effective compression ratio setpoint 332 using one or more functions or mappings that relate the base air torque request 308 and the engine speed 316 to the setpoints. The setpoint module 312 may also generate one or more other setpoints based on the base air torque request 308 and the engine speed 316.

The manifold pressure setpoint 318 may refer to a target pressure within the intake manifold 110. The APC setpoint 320 may refer to a target mass of air to be drawn into a cylinder for a combustion event. An effective compression ratio may also be referred to as a dynamic compression ratio.

Dilution may refer to an amount of exhaust from a prior combustion event trapped within a cylinder for a combustion event. External dilution may refer to exhaust provided for a combustion event via the EGR valve 170. Internal dilution may refer to exhaust that remains in a cylinder and/or exhaust that is pushed back into the cylinder following the exhaust stroke of a combustion cycle. The external dilution setpoint 324 may refer to a target amount of external dilution. The internal dilution setpoint 328 may refer to a target amount of internal dilution.

The setpoint module 312 may generate one or more of the setpoints 318-332 further based on desired combustion phasing 336 and a cylinder mode 340. The cylinder mode 340 may refer to, for example, the number of cylinders that are deactivated (or activated) and/or a mode of operation of the engine 102 where one or more cylinders (e.g., half or another fraction) are deactivated.

When one or more cylinders are deactivated, each cylinder that is activated is responsible for producing a greater amount of torque in order to achieve the base air torque request 308. The setpoint module 312 may therefore adjust one or more of the setpoints 318-332 based on the cylinder mode 340. For example, the setpoint module 312 may increase the APC setpoint 320 based on the cylinder mode 340. The setpoint module 312 may additionally or alternatively adjust one or more of the other setpoints 318-332 based on the cylinder mode 340.

Combustion phasing may refer to a crankshaft position where a predetermined amount of injected fuel is combusted within a cylinder relative to a predetermined crankshaft position for combustion of the predetermined amount of injected fuel. For example, combustion phasing may be expressed in terms of CA50 relative to a predetermined CA50. CA50 may refer to a crankshaft position (or angle, hence CA) where 50 percent of a mass of injected fuel has been combusted within a cylinder. The predetermined CA50 may correspond to a CA50 where a maximum amount of work is produced from the fuel injected and may be approximately 8.5-approximately 10 degrees after TDC.

A combustion phasing module 344 (FIG. 2) may generally set the desired combustion phasing 336 such that the CA50 occurs at the predetermined CA50. In other words, the combustion phasing module 344 may generally set the desired combustion phasing 336 such that zero combustion phasing occurs to achieve the maximum work and therefore a maximum fuel efficiency. However, the combustion phasing module 344 may selectively adjust the desired combustion phasing 336 under some circumstances.

For example, the combustion phasing module 344 may set the desired combustion phasing such that the CA50 occurs after the predetermined CA50 when knock is detected. Knock may be detected, for example, using one or more knock sensors. Additionally or alternatively, the combustion phasing module 344 may set the desired combustion phasing such that the CA50 occurs after the predetermined CA50 when one or more conditions are present that may cause knock to occur. For example, knock may occur when a quality of fuel within a fuel tank of the vehicle is less than a predetermined quality and/or the ambient temperature is greater than a predetermined temperature and ambient humidity is less than a predetermined value.

When combustion is retarded such that the CA50 occurs after the predetermined CA50, airflow into the cylinders should be increased to achieve the base air torque request 308. The setpoint module 312 may therefore adjust one or more of the setpoints 318-332 based on the desired combustion phasing 336. For example, the setpoint module 312 may increase the APC setpoint 320 when the desired combustion phasing 336 is retarded to provide a CA50 that is after the predetermined CA50.

The setpoint module 312 also generates the setpoints 318-332 based on one or more setpoint constraints 348. A constraint setting module 352 may set the setpoint constraints 348 for the setpoints 318-332 to predetermined acceptable ranges, respectively. The setpoint module 312 sets the setpoints 318-332 to remain within the setpoint constraints 348, respectively.

However, the constraint setting module 352 may selectively adjust a setpoint constraint under some circumstances. For example only, the constraint setting module 352 may set a setpoint constraint to disable dilution. The setpoint module 312 may limit the external dilution setpoint 324 and the residual dilution setpoint 328 to zero in response the setpoint constraint to disable dilution.

The setpoint module 312 may also adjust one or more of the other setpoints based on the limitation of a setpoint. For example, the setpoint module 312 may increase the APC setpoint 320 in order to achieve the base air torque request 308 when the external and residual dilution setpoints 324 and 328 are limited.

A model predictive control (MPC) module 360 generates the target values 266-270, subject to actuator constraints 364, based on the setpoints 318-332, sensed values 368, actual combustion phasing 372, and a model 376 of the engine 102, using MPC. MPC involves the MPC module 360 identifying possible sequences of the target values 266-270 that could be used together during N future control loops, subject to the actuator constraints 364, and given the sensed values 368 and the actual combustion phasing 372, to achieve the setpoints 318-332.

Each possible sequence includes one sequence of N values for each of the target values 266-270. In other words, each possible sequence includes a sequence of N values for the target wastegate opening area 266, a sequence of N values for the target throttle opening area 267, a sequence of N values for the target EGR opening area 268, a sequence of N values for the target intake cam phaser angle 269, and a sequence of N values for the target exhaust cam phaser angle 270. Each of the N values are for a corresponding one of the N future control loops.

The MPC module 360 determines predicted responses of the engine 102 to the identified possible sequences of the target values 266-270, respectively, using the model 376 of the engine 102. The MPC module 360 generates a prediction for parameters corresponding to the setpoints 318-332 based on a given possible sequence of the target values 266-270. More specifically, based on a given possible sequence of the target values 266-270, using the model 376, the MPC module 360 generates a sequence of predicted manifold pressures for the N control loops, a sequence of predicted APCs for the N control loops, a sequence of predicted amounts of external dilution for the N control loops, a sequence of predicted amounts of residual dilution for the N control loops, and a sequence of predicted compression ratios for the N control loops. The model 376 may include, for example, one or more functions and/or mappings calibrated based on characteristics of the engine 102.

The MPC module 360 determines a cost (value) for each of the possible sequences of the target values 266-270 based on relationships between the setpoints 318-332 and the predictions, respectively. For example, the MPC module 360 may determine the cost for each of the possible sequences of the target values 266-270 based on the periods for the predicted parameters to reach the setpoints 318-332, respectively, and/or amounts that the predicted parameters overshoot the setpoints 318-332, respectively. For example only, the cost may increase as the period for a predicted parameter to reach a setpoint increases and/or as the amount that the predicted parameter overshoots the setpoint increases.

Each pair of predicted parameters and setpoints may be weighted to affect how much the relationships between the predicted parameters and the setpoints affects the cost determinations. For example, the relationship between the predicted APC and the APC setpoint 320 maybe weighted to affect the costs more than the relationship between another predicted parameter and the corresponding setpoint.

The MPC module 360 selects one of the possible sequences of the target values 266-270 based on the costs of the possible sequences of the target values 266-270. For example, the MPC module 360 may select the one of the possible sequences having the lowest cost.

The MPC module 360 may then set the target values 266-270 to the first ones of the N values of the selected possible sequence, respectively. In other words, the MPC module 360 may set the target wastegate opening area 266 to the first one of the N values in the sequence of N values for the target wastegate opening area 266, set the target throttle opening area 267 to the first one of the N values in the sequence of N values for the target throttle opening area 267, set the target EGR opening area 268 to the first one of the N values in the sequence of N values for the target EGR opening area 268, set the target intake cam phaser angle 269 to the first one of the N values in the sequence of N values for the target intake cam phaser angle 269, and set the target exhaust cam phaser angle 270 to the first one of the N values in the sequence of N values for the target exhaust cam phaser angle 270. During a next control loop, the MPC module 360 identifies possible sequences, generates the predicted responses of the possible sequences, determines the cost of each of the possible sequences, selects of one of the possible sequences, and sets the target values 266-270 to the first set of the target values 266-270 in the selected possible sequence.

The constraint setting module 352 may set the actuator constraints 364. Generally, the constraint setting module 352 may set the actuator constraints 364 for the throttle valve 112, the EGR valve 170, the wastegate 162, the intake cam phaser 148, and the exhaust cam phaser 150 to predetermined acceptable ranges, respectively. The MPC module 360 identifies the possible sequences such that the target values 266-270 remain within the actuator constraints 364, respectively.

The constraint setting module 352 may selectively adjust an actuator constraint under some circumstances. For example, the constraint setting module 352 may adjust the actuator constraint for a given engine actuator to narrow the range of possible targets for that engine actuator when a fault is diagnosed in that engine actuator. For another example only, the constraint setting module 352 may adjust the actuator constraint such that the target value for a given actuator follows a predetermined schedule for a fault diagnostic, such as a cam phaser fault diagnostic or an EGR diagnostic.

The sensed values 368 may be measured using sensors or determined based on one or more values measured using one or more sensors. The actual combustion phasing 372 may be determined, for example, based on the actual CA50 during a previous predetermined period relative to the predetermined CA50. Retardation of the CA50 relative to the predetermined CA50 during the predetermined period may indicate that extra energy has been input to the exhaust system 134. The MPC module 360 may therefore increase the target wastegate opening area 266 to offset the extra energy in the exhaust system 134. Otherwise, the extra energy may cause boost of the turbocharger to increase.

Figure 4:
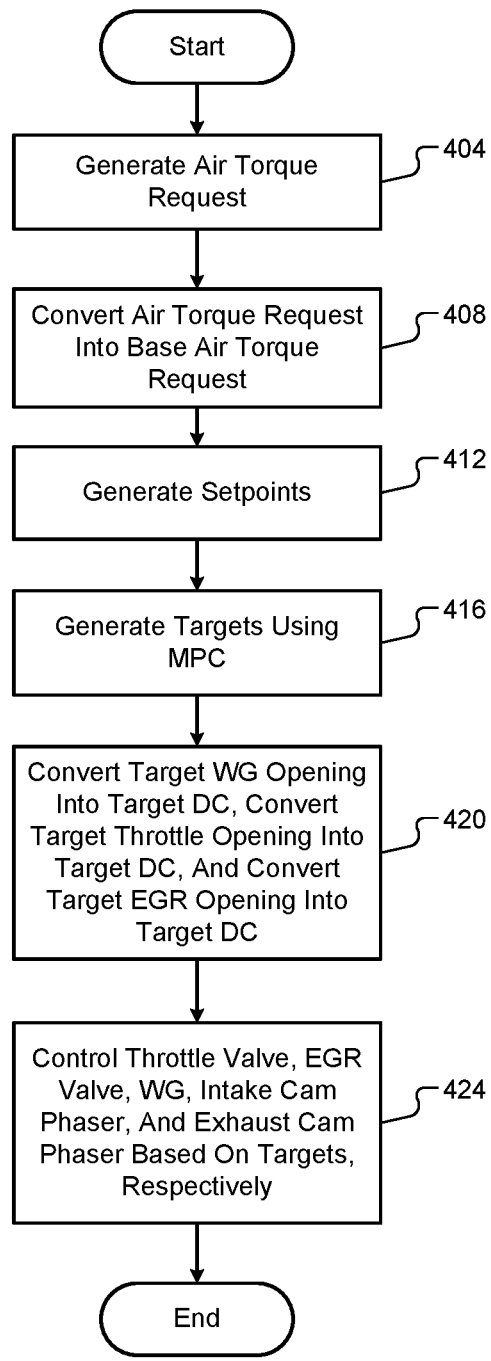
FIG. 4 includes a flowchart depicting an example method of controlling a throttle valve, intake and exhaust valve phasing, a wastegate, and an exhaust gas recirculation (EGR) valve using a model predictive control module according to the present disclosure.

Referring now to FIG. 4, a flowchart depicting an example method of controlling the throttle valve 112, the intake cam phaser 148, the exhaust cam phaser 150, the wastegate 162, and the EGR valve 170 using MPC (model predictive control) is presented. Control may begin with 404 where the torque requesting module 224 determines the air torque request 265 based on the adjusted predicted and immediate torque requests 263 and 264.

At 408, the torque conversion module 304 may convert the air torque request 265 into the base air torque request 308 or into another type of torque suitable for use by the setpoint module 312. At 412, the setpoint module 312 generates the setpoints 318-332 based on the base air torque request 308 and the engine speed 316, subject to the setpoint constraints 348. The setpoint module 312 may generate the setpoints 318-332 further based on the cylinder mode 340 and/or the desired combustion phasing 336.

At 416, the MPC module 360 generates the target values 266-270 based on the setpoints 318-332, subject to the actuator constraints 364, using MPC. More specifically, as described above, the MPC module 360 identifies possible sequences of the target values 266-270 and generates predicted responses using the model 376. The MPC module 360 also determines costs for the possible sequences based on the predicted responses, selects one of the possible sequences based on the costs, and sets the target values 266-270 based on the first ones of the target values in the selected possible sequence, respectively.

At 420, the first conversion module 272 converts the target wastegate opening area 266 into the target duty cycle 274 to be applied to the wastegate 162, the second conversion module 276 converts the target throttle opening area 267 into the target duty cycle 278 to be applied to the throttle valve 112. The third conversion module 280 also converts the target EGR opening area 268 into the target duty cycle 282 to be applied to the EGR valve 170 at 420. The fourth conversion module may also convert the target intake and exhaust cam phaser angles 269 and 270 into the target intake and exhaust duty cycles to be applied to the intake and exhaust cam phasers 148 and 150, respectively.

At 424, the throttle actuator module 116 controls the throttle valve 112 to achieve the target throttle opening area 267, and the phaser actuator module 158 controls the intake and exhaust cam phasers 148 and 150 to achieve the target intake and exhaust cam phaser angles 269 and 270, respectively. For example, the throttle actuator module 116 may apply a signal to the throttle valve 112 at the target duty cycle 278 to achieve the target throttle opening area 267. Also at 424, the EGR actuator module 172 controls the EGR valve 170 to achieve the target EGR opening area 268, and the boost actuator module 164 controls the wastegate 162 to achieve the target wastegate opening area 266. For example, the EGR actuator module 172 may apply a signal to the EGR valve 170 at the target duty cycle 282 to achieve the target EGR opening area 268, and the boost actuator module 164 may apply a signal to the wastegate 162 at the target duty cycle 274 to achieve the target wastegate opening area 266. While FIG. 4 is shown as ending after 424, FIG. 4 may be illustrative of one control loop, and control loops may be executed at a predetermined rate.

Referring now to FIG. 5A, a functional block diagram of an example MPC design device 504 is presented. One or more users (e.g., vehicle design engineers) create and design the functionality of the MPC module 360 using the MPC design device 504.

The MPC design device 504 may include a modeling module 508 that generates MPC data 512 creating the functionality of the MPC module 360 based on user input 516 to the MPC design device 504. The user input 516 may include user input from a keyboard, a mouse, a display, and/or one or more other suitable types of user input devices. While the present disclosure will be discussed in terms of the functionality of the MPC module 360, the present disclosure is also applicable to other types of MPC controllers including MPC controllers that determine additional and/or other target values for other engine actuators, MPC controllers for actuators of a transmission, MPC controllers of a hybrid vehicle, and other types of MPC controllers.

The user(s) may design, for example, code for determining the possible sequences of the target values 266-270, subject to the actuator constraints 364, and given the sensed values 368 and the actual combustion phasing 372, to achieve the setpoints 318-332. The user(s) may also design the model 376, code for determining the predicted responses of the engine 102 to the identified possible sequences of the target values 266-270, respectively, and code for determining the cost for each of the possible sequences of the target values 266-270 based on relationships between the setpoints 318-332 and the predictions, respectively. The user(s) may also design code for determining how much to weight each predicted parameter/setpoint relationship in determining the cost, code for determining which set of the possible sequences of the target values 266-270 to use, and code for providing other functions. The user(s) may also set other types of information, such as calibrated values for parameters/variables used by the code, variable types (e.g., integer, float, etc.).

Based on the MPC data 512 generated based on the user input 516, a code generator module 520 generates an MPC.c file 524 and an MPC.h file 528. The MPC.c file 524 includes source code for providing the functionality of the MPC module 360 and includes other data. The MPC.h file 528 includes various data that supports the MPC.c file 524, such as variable declarations and other types of data. Files with the file extension .h may be referred to as header files. Files with the file extension .c may be referred to as code files.

For example, the MPC.c file 524 includes code for determining the possible sequences of the target values 266-270, subject to the actuator constraints 364, and given the sensed values 368 and the actual combustion phasing 372, to achieve the setpoints 318-332. The MPC.c file 524 also includes code for the model 376, code for determining the predicted responses of the engine 102 to the identified possible sequences of the target values 266-270, respectively, code for determining the cost for each of the possible sequences of the target values 266-270 based on relationships between the setpoints 318-332 and the predictions, respectively, code for determining how much to weight each predicted parameter/setpoint relationship in determining the cost, code for determining which set of the possible sequences of the target values 266-270 to use, and code for performing other functions of the MPC module 360.

As shown in FIG. 5A, the code generator module 520 may also generate a separate file including MPC calibration data 532 based on the user input 516. For example, the code generator module 520 may generate a file, such as a comma separated value (CSV) file, that includes the MPC calibration data 532. The MPC calibration data 532 includes user set values for parameters used by the code of the MPC.c file 524. For example, the code stored in the MPC.c file 524 may call various parameters, and the values of those parameters are stored in the MPC calibration data 532. The calibrated values may be in the form values separated by commas or commas separated values.

As shown in FIG. 5B, the code generator module 520 may instead generate an MPC.h file 536 that includes both the data included in the MPC.h file 528 and the MPC calibration data 532. A parser module 538 may parse the MPC.h file 536 to identify the MPC calibration data 532 and separate the MPC.h file 536 into the MPC.h file 528 and a file including the MPC calibration data 532. For example only, the parser module 538 may identify values (corresponding to the MPC calibration data 532) stored in the MPC.h file 536, create another file for the MPC calibration data 532, and move the values to the file for the MPC calibration data 532.

Referring now to FIGS. 5A and 5B, the MPC design device 504 may include a compiler module 540 and includes an input/output (I/O) port 544. The MPC design device 504 communicates with the MPC design device 504 via the I/O port 544 and an I/O port of the vehicle. For example, the MPC design device 504 may communicate via a cable connected between the I/O port 544 and the I/O port of the vehicle.

The compiler module 540 compiles the MPC.c file 524 and the MPC.h file 528 to produce an object file (including object code generated based on the MPC.c file 524 and the MPC.h file 528) that is suitable for execution and use by the ECM 114. While the parser module 538 is shown and discussed as parsing the MPC.h file 528 prior to the compiler module 540 performing the compiling, the parsing of the MPC.h file and transfer of the MPC calibration data 532 to a separate file may be performed after the compiling is performed. The object code and the MPC calibration data 532 are stored separately, as discussed further below.

Figure 6:
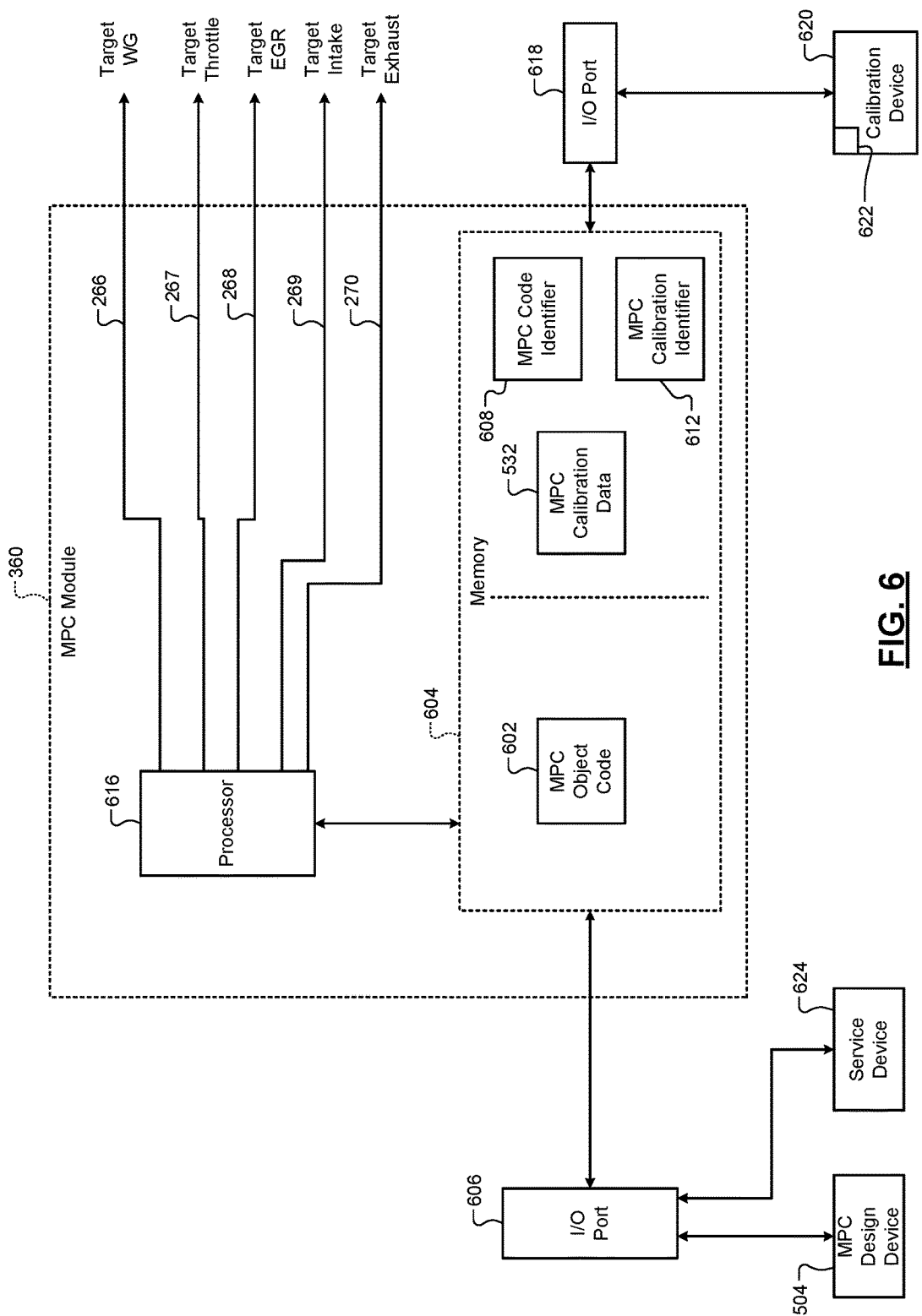
FIG. 6 is a functional block diagram including an example portion of an engine control module corresponding to the model predictive control module according to the present disclosure.

Referring now to FIG. 6, a functional block diagram of an example portion of the ECM 114 corresponding to the MPC module 360 is presented. The ECM 114 includes one or more tangible computer readable mediums, such as memory 604. The compiler module 540 may store an MPC object code 602 and the MPC calibration data 532 in the memory 604 or in another suitable tangible computer readable medium. The MPC object code 602 results from the compiling of the MPC.c file 524 and the MPC.h file 528 and includes object code generated based on the MPC.c file 524 and the MPC.h file 528.

The vehicle includes a first I/O port 606, and the MPC design device 504 may communicate with the vehicle via the first I/O port 606. The first I/O port 606 may include, for example, an Assembly Line Diagnostic Link (ALDL) port or an On Board Diagnostic (OBD) compliant I/O port. For example, the MPC design device 504 may communicate with the vehicle over a cable connected between the MPC design device 504 and the first I/O port 606.

The compiler module 540 updates an MPC code identifier 608 based on a version or identifier of the MPC.c file 524 and the MPC.h file 528 (or the MPC object code 602) when the MPC object code 602 is stored. The compiler module 540 also updates an MPC calibration identifier 612 based on a version or identifier of the MPC calibration data 532 when the MPC calibration data 532 is stored.

The ECM 114 includes one or more processors, such as processor 616, that execute the object code to provide the functionality of the ECM 114. For example, to perform the functions of the MPC module 360, the processor 616 executes the MPC object code 602 using values stored in the MPC calibration data 532. While the present disclosure will be described in terms of use of only the processor 616, the functionality of the MPC module 360 may be provided by a combination of two or more processors in various implementations.

The MPC object code 602 includes object code that is executed by the processor 616 to provide the functionality of the MPC module 360. For example, the MPC object code 602 includes object code for determining the possible sequences of the target values 266-270, subject to the actuator constraints 364, and given the sensed values 368 and the actual combustion phasing 372, to achieve the setpoints 318-332. The MPC object code 602 also includes object code for the model 376, object code for determining the predicted responses of the engine 102 to the identified possible sequences of the target values 266-270, respectively, object code for determining the cost for each of the possible sequences of the target values 266-270 based on relationships between the setpoints 318-332 and the predictions, respectively, object code for determining how much to weight each predicted parameter/setpoint relationship in determining the cost, object code for determining which set of the possible sequences of the target values 266-270 to use, and object code for providing other functions provided by the MPC module 360.

The MPC calibration data 532 includes calibrated values for parameters used by the MPC object code 602. For example, the MPC object code 602 may call various calibrated parameters, and the values of those calibrated parameters are stored in the MPC calibration data 532. For example only, the MPC calibration data 532 includes calibrated values for parameters called by the MPC object code 602 for determining the possible sequences of the target values 266-270, calibrated values for the parameters called by the MPC object code 602 for the model 376, calibrated values for the parameters called by the MPC object code 602 for determining the predicted responses of the engine 102 to the identified possible sequences of the target values 266-270, respectively. The MPC calibration data 532 also includes calibrated values for the parameters called by the MPC object code 602 for determining the cost for each of the possible sequences of the target values 266-270, calibrated values for the parameters called by the MPC object code 602 for determining how much to weight each predicted parameter/setpoint relationship in determining the cost, and calibrated values for the parameters called by the MPC object code 602 for determining which set of the possible sequences of the target values 266-270 to use.

The compiler module 540 stores the MPC calibration data 532 in a calibration portion of the memory 604. The MPC object code 602 is stored separately from the MPC calibration data 532. The calibration portion may be partitioned off from another portion of the memory 604 where the MPC.c file 524 and the MPC.h file 528 are stored. The calibration portion of the memory 604 is readable and re-writable. For example, the calibration portion of the memory 604 may be readable and re-writable by external devices that communicate with the vehicle, such as a service device and a calibration device, as discussed further below.

The portion of the memory 604 where the MPC object code 602 is stored may also be readable and re-writable. For example, the MPC object code 602 may be readable and re-writable by a service device and a calibration device. However, the MPC object code 602 is large relative to the MPC calibration data 532. Thus, reading and re-writing the MPC object code 602 requires a much longer period than the MPC calibration data 532, which can be updated in whole or in part quickly.

Instead of being stored separately, the MPC calibration data 532 could be stored within the MPC.h file 528. However, if the MPC calibration data 532 was stored within the MPC.h file 528, the MPC.c file 524 and the MPC.h file 528 would have to be re-compiled and the resulting MPC object code would have to be re-stored in the memory 604 each time that the MPC calibration data 532 was changed. The requirement to re-compile the MPC.c file 524 and the MPC.h file 528 and re-store the resulting MPC object code each time that the MPC calibration data 532 is changed is time and resource consuming.

As the MPC calibration data 532 is stored in the calibration portion of the memory 604, which is readable and re-writable, the MPC calibration data 532 can be viewed and updated as desired. The MPC calibration data 532 can be updated in both production vehicles and design vehicles.

Production vehicles include vehicles produced by a vehicle manufacturer that are intended for use in public. Design vehicles include vehicles used by a vehicle manufacturer to calibrate and set the MPC calibration data 532 used in production vehicles. In addition to the first I/O port 606, design vehicles also include a second I/O port 618. The second I/O port 618 may include, for example, an Ethernet port or another suitable type of I/O port. Production vehicles do not include the second I/O port 618.

A calibration device 620 may be used during vehicle design and can communicate with the ECM 114 via the second I/O port 618. For example, the calibration device 620 may communicate with the ECM 114 via a cable connected between the calibration device 620 and the second I/O port 618. The calibration device 620 includes one or more user I/O devices, such as a display (which may be a touchscreen display) 622, a keyboard, a pointer, a track ball, buttons, switches, etc.

The calibration device 620 selectively updates the MPC calibration data 532 with a (different) set of the MPC calibration data stored in the calibration device 620 in response to user input to the calibration device 620. The calibration device 620 may include one or more different sets of MPC calibration data that are stored within the calibration device 620.

Each time that the MPC calibration data 532 is updated, the calibration device 620 updates the MPC calibration identifier 612 based on a version/identifier of the set of MPC calibration data that is then stored in the memory 604. Operating design vehicles with various different sets of the MPC calibration data may enable one set of MPC calibration data to be identified for use in production vehicles.

A service device 624 can communicate with the ECM 114 via the first I/O port 606. For example, the service device 624 may communicate with the ECM 114 via a cable connected between the service device 624 and the first I/O port 606. The service device 624 includes one or more user I/O devices, such as a display (which may be a touchscreen display), a keyboard, a pointer, a track ball, buttons, switches, etc.

The service device 624 may, for example, read the MPC calibration identifier 612 and determine whether the MPC calibration identifier 612 is different than a predetermined identifier of a newest set of MPC calibration data available for the vehicle. When the MPC calibration identifier 612 is different than the predetermined identifier of the newest set of MPC calibration data for the vehicle, the service device 624 may download the newest set of MPC calibration data for the vehicle to the service device 624. The service device 624 may update the MPC calibration data 532 with the newest set of MPC calibration data for the vehicle and update the MPC calibration identifier 612 based on the predetermined identifier. In this manner, the MPC calibration data 532 stored in the vehicle can be easily updated post-sale without having to also update the MPC object code 602. However, the MPC code identifier 608 is also updated each time that the MPC object code 602 is updated.

Referring now to FIG. 7A, a flowchart depicting an example method of generating and storing the MPC object code 602 and the MPC calibration data 532 that may be performed by the MPC design device 504 is presented. At 704, the modeling module 508 receives the user input 516 for creating the MPC module 360 and generates the MPC data 512.

At 708, the code generator module 520 may identify user input data corresponding to the MPC calibration data 532. The code generator module 520 generates the MPC.c file 524, the MPC.h file 528, and the file including the MPC calibration data 532 at 712. At 716, the compiler module 540 compiles the MPC.c file 524 and the MPC.h file 528 to generate the MPC object code 602. At 720, the compiler module 540 stores the MPC object code 602 in the memory 604 of the ECM 114. Also at 720, the compiler module 540 stores the MPC calibration data 532, separately from the MPC object code 602, in the memory 604 of the ECM 114. Once stored, the processor 616 executes the MPC object code 602 using the MPC calibration data 532 to generate the target values 266-270.

Referring now to FIG. 7B, another flowchart depicting an example method of generating and storing the MPC object code 602 and the MPC calibration data 532 that may be performed by the MPC design device 504 is presented. At 804, the modeling module 508 receives the user input 516 for creating the MPC module 360 and generates the MPC data 512.

At 808, the code generator module 520 generates the MPC.c file 524 and the MPC.h file 536 based on the user input 516. The MPC.h file 536 includes the MPC calibration data 532. The parser module 538 identifies the MPC calibration data 532 stored within the MPC.h file 536 at 812. For example, the parser module 538 may identify the values corresponding to the MPC calibration data 532 stored in the MPC.h file 536. At 816, the parser module 538 transfers the MPC calibration data 532 from the MPC.h file 536 into a separate file to produce the MPC.h file 528 and a separate file including the MPC calibration data 532.

The compiler module 540 compiles the MPC.c file 524 and the MPC.h file 528 at 820 to generate the MPC object code 602. At 824, the compiler module 540 stores the MPC object code 602 in the memory 604 of the ECM 114. Also at 720, the compiler module 540 stores the MPC calibration data 532, separately from the MPC object code 602, in the memory 604 of the ECM 114. Once stored, the processor 616 executes the MPC object code 602 using the MPC calibration data 532 to generate the target values 266-270.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system, comprising:
an engine control module (ECM) of a vehicle, comprising:
   a tangible computer readable medium including:
     object code referencing a plurality of variables stored in a calibration data file, the object code for:
       identifying sets of possible target values based on air and exhaust setpoints for an engine;
       generating predicted parameters based on a model of the engine and the sets of possible target values, respectively;
       selecting one of the sets of possible target values based on the predicted parameters;
       setting target values based on the selected one of the sets of possible target values, respectively; and controlling opening of a throttle valve based on a first one of the target values; and the calibration data file, wherein the calibration data file is stored separately from the object code and includes the predetermined values for the variables referenced in the object code, respectively; and at least one processor that executes the object code using the predetermined values to perform the identifying, the generating, the selecting, the setting, and the controlling; and a model predictive control (MPC) design device that generates a source code file and a header file based on user input, the header file including the predetermined values for the variables referenced in the object code, that identifies the predetermined values within the header file, that generates the calibration data file that includes the predetermined values from the header file, that compiles the source code file and the header file to produce the object code, that stores the object code in the tangible computer readable medium of the ECM, and that stores the calibration data file in the tangible computer readable medium of the ECM separately from the object code.

2. The system of claim 1 wherein the tangible computer readable medium further includes:
data indicative of a first identifier of the object code; and
data indicative of a second identifier of the calibration data file.

3. The system of claim 1 further comprising:
a calibration device that is separate from the ECM and the MPC design device, that includes a display, and that displays the predetermined values for the variables referenced in the object code on the display.

4. The system of claim 3 wherein the calibration device further:
includes a second calibration data file including a second set of predetermined values for the variables referenced in the object code; and
replaces the calibration data file with the second calibration data file in response to user input.

5. The system of claim 4 wherein:
the tangible computer readable medium further includes:
data indicative of a first identifier of the object code; and
data indicative of a second identifier of the calibration data file; and
the calibration device further replaces the data indicative of the second identifier with data indicative of a third identifier of the second calibration data file after replacing the calibration data file with the second calibration data file.

6. The system of claim 1 wherein the object code further includes object code for:
controlling opening of a wastegate based on a second one of the target values;
controlling opening of an exhaust gas recirculation (EGR) valve based on a third one of the target values; and
controlling intake and exhaust valve phasing based on fourth and fifth ones of the target values, respectively.

7. The system of claim 1 wherein the object code further includes object code for selecting the one of the sets of possible target values further based on the air and exhaust setpoints.

8. The system of claim 7 wherein the object code further includes object code for selecting the one of the sets of possible target values based on comparisons of the air and exhaust setpoints with the predicted parameters, respectively.

9. A method comprising:
using at least one processor of a vehicle, selectively executing object code using a calibration data file that is stored separately from the object code in a tangible computer readable medium of the vehicle,
wherein the calibration data file includes predetermined values for variables referenced in the object code, respectively; and
the object code includes object code for:
identifying sets of possible target values based on air and exhaust setpoints for an engine;
generating predicted parameters based on a model of the engine and the sets of possible target values, respectively;
selecting one of the sets of possible target values based on the predicted parameters;
setting target values based on the selected one of the sets of possible target values, respectively; and
controlling opening of a throttle valve based on a first one of the target values; and
using model predictive control (MPC) design device that is separate from the vehicle and the at least one processor:
generating a source code file and a header file based on user input, the header file including the predetermined values for the variables referenced in the object code;
identifying the predetermined values within the header file;
generating the calibration data file that includes the predetermined values from the header file;
compiling the source code file and the header file to produce the object code;
storing the object code in the tangible computer readable medium; and
storing the calibration data file in the tangible computer readable medium, separately from the object code.

10. The method of claim 9 wherein the tangible computer readable medium further includes:
data indicative of a first identifier of the object code; and
data indicative of a second identifier of the calibration data file.

11. The method of claim 9 further comprising:
using a calibration device that is separate from the vehicle and the MPC design device, displaying the predetermined values for the variables referenced in the object code on a display of the calibration device.

12. The method of claim 11 further comprising:
using the calibration device, replacing the calibration data file with a second set of calibration data file in response to user input,
wherein the second calibration data file includes a second set of predetermined values for the variables referenced in the object code.

13. The method of claim 12 wherein:
the tangible computer readable medium further includes:
data indicative of a first identifier of the object code; and
data indicative of a second identifier of the calibration data file; and
the method further comprises:
using the calibration device, further replacing the data indicative of the second identifier with data indicative of a third identifier of the second calibration data file after replacing the calibration data file with the second sot of calibration data file.

14. The method of claim 9 wherein the object code further includes object code for:

controlling opening of a wastegate based on a second one of the target values;

controlling opening of an exhaust gas recirculation (EGR) valve based on a third one of the target values; and controlling intake and exhaust valve phasing based on fourth and fifth ones of the target values, respectively.

15. The method of claim 9 wherein the object code further includes object code for selecting the one of the sets of possible target values further based on the air and exhaust setpoints.

16. The method of claim 15 wherein the object code further includes object code for selecting the one of the sets of possible target values based on comparisons of the air and exhaust setpoints with the predicted parameters, respectively.

* * * * *